June 27, 1944.   A. M. GUILLET   2,352,537
LEVEL FOR ROVING FRAMES
Filed Dec. 11, 1943   2 Sheets-Sheet 1

A. M. Guillet
Inventor

By
Paul S Eaton   Attorney

June 27, 1944.  A. M. GUILLET  2,352,537
LEVEL FOR ROVING FRAMES
Filed Dec. 11, 1943   2 Sheets-Sheet 2
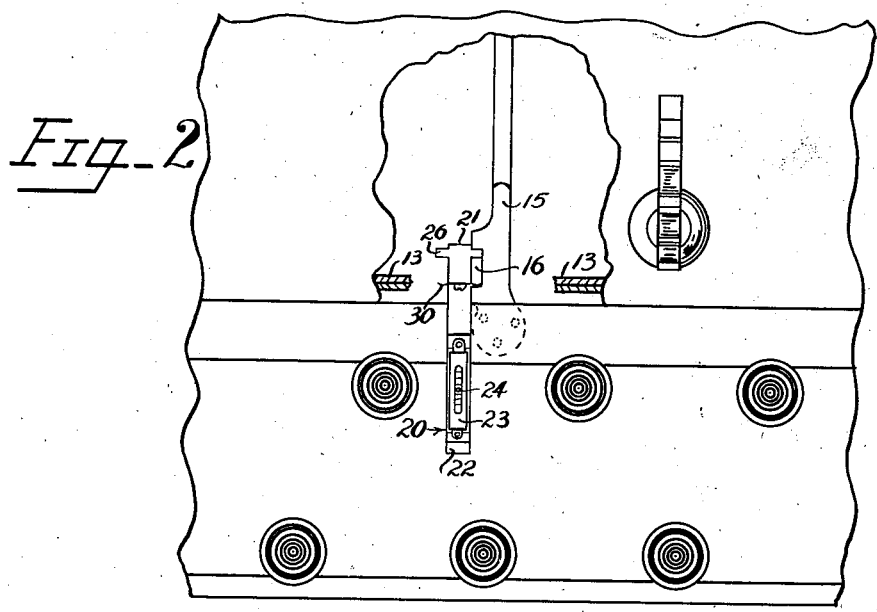
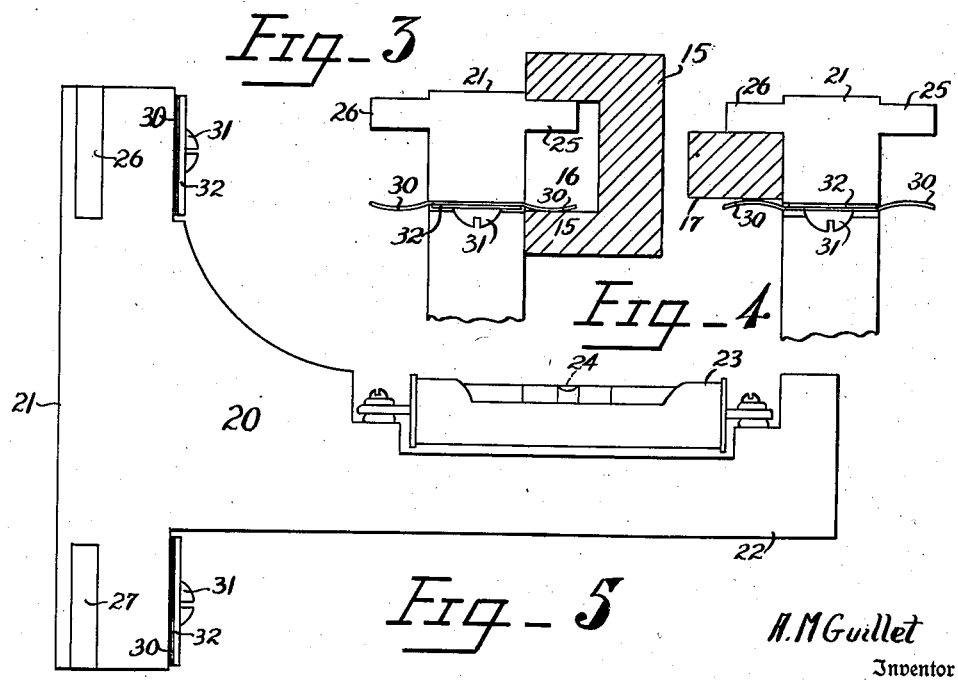
A. M. Guillet
Inventor
By Paul S. Eaton
Attorney Patented June 27, 1944

2,352,537

UNITED STATES PATENT OFFICE 2,352,537

LEVEL FOR ROVING FRAMES

Albert M. Guillet, Charlotte, N. C.

Application December 11, 1943, Serial No. 513,906

2 Claims. (Cl. 33—207)

This invention relates to an improved level for leveling roving frames which can be attached to certain parts of the frame of the roving frame, and which renders the level visible to the operator by projecting the leveling instrument outwardly to where it is easily visible, and not obscured by other parts of the machine.

It is an object of this invention to provide an interchangeable level which is adapted to clampingly engage the sidewalls of certain vertically disposed ribs and grooves of a roving frame, with the level having a laterally extending arm provided with a spirit level, so that the arm will project outwardly from beneath certain portions of the machine which would ordinarily obscure a level, if the level associated with the clamping means were in close proximity to the clamping means.

It is another object of this invention to provide a particular frame for holding a spirit level, which frame is adapted to engage certain vertically disposed portions of a roving frame, said level frame having a laterally projecting arm equipped with the spirit level so that the spirit level will project outwardly into a position in the machine where it can be viewed by the operator looking approximately straight downwardly onto the machine. If the level were not in full view of the operator, so that he could look approximately straight downwardly onto it, he would have to look at an angle and not be able to judge when the bubble in the spirit level was centered due to the angularity at which he looks at the bubble. By providing a frame for a spirit level, having means for clampingly engaging a portion of a roving frame and projecting outwardly into full view of the operator, much time is saved in removal of parts of the machine to gain an accurate view of the spirit level bubble, and more accuracy is obtained as the result of the operator having a vertical line of vision to view the bubble in the spirit level.

Some of the objects of the invention having been stated, other objects will appear as the description proceeds, when taken in connection with the accompanying drawings, in which:

Figure 2 is a top plan view with parts broken away and looking downwardly from the top of Figure 1;

Figure 3 is a transverse sectional view taken along the line 3—3 in Figure 1;

Figure 4 is a transverse sectional view taken along the line 4—4 in Figure 1;

Figure 5 is a side elevation of the level showing the same detached from the machine.

Figure 1:
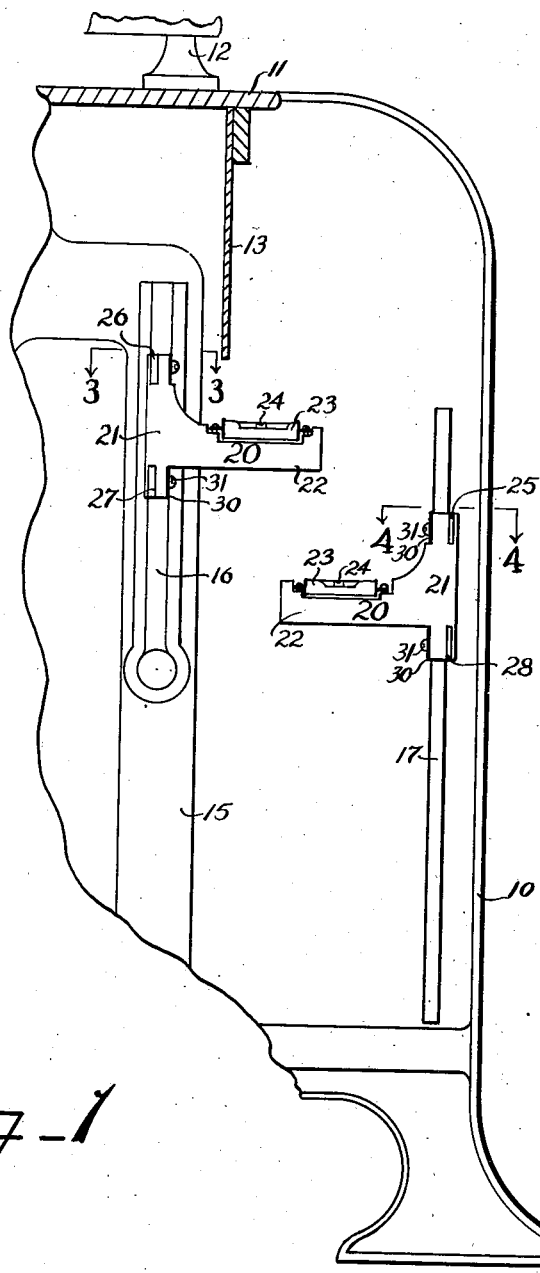
Figure 1 is a vertical sectional view taken through a portion of a roving frame, showing my level attached to two different parts of the frame.

Referring more specifically to the drawings, the numeral 10 indicates the end frame of a conventional roving frame having a roll stand beam 11 and a plurality of roll stands 12 and a downwardly projecting frame plate 13 which extends from one end of the machine to the other. Disposed along the machine are vertical rib members 15 which have grooves 16 therein for accommodation of the traverse motion. Also disposed adjacent on the inner side of the end members 10, there is a rib 17 associated with each end frame member 10. It is with a machine of this type that my invention is adapted to be used. I provide a spirit level frame 20 having a vertically disposed portion 21 and a horizontally disposed portion 22. The portion 22 has a conventional spirit level 23 removably secured therein with the bubble 24 being shown in centered position. The upper and lower ends of the member 21 have laterally projecting portions 25 and 26, and the lower end has similar ribs 27 and 28. To the right-hand surface of the member 21, as seen in Figure 5, and at the upper and lower ends thereof, there is adapted to be secured leaf spring members 30 by means of a screw 31 penetrating a hole in the leaf spring member 30, and being threadably embedded in the upright portion 21. There is associated with each of the leaf spring members 30 a shim or washer 32. When it is desired to attach the level frame to the vertical rib 17, the shim or washer member 32 is placed between the upright portion 21, and the leaf spring 30, and thus it tightly engages the vertical rib 17. When it is desired to insert the level in the groove 16, the screw 31 is removed and the leaf spring 30 together with its washer or shim 32 is reversed, so that the washer 32 appears on the outside of the leaf spring 30 or against the head of the screw 31.

It is thus seen that the operator can press the members 25 and 28 and leaf springs 30 into the groove 16 by reaching underneath the board 11 and behind the vertical board or plate 13, and the level will be projected out into clear view of the operator whereby he can ascertain if the frame is in proper vertical position. After taking the readings from all of the grooves 16 in the frame members 15 spaced apart longitudinally of the machine, the operator can then remove screw 31 and reverse the position of washer 32 and leaf spring 30, and clamp the level onto the vertical ribs 17 and use the same level for leveling all portions of the machine.

In the drawings and specification, there has been set forth a preferred embodiment of the invention, and although specific terms are employed, they are used in a generic and descriptive sense only, and not for purposes of limitation, the scope of the invention being defined in the claims.

I claim:

1. In a level adapted to be used in leveling roving frames and the like by detachably securing the same to ribs and grooves in the framework of said machine, a vertically disposed portion and a horizontally extending portion projecting at right angles to the vertically disposed portion, a spirit level mounted on the horizontally extending portion, the vertically disposed portion having laterally projecting portions on each side thereof at its upper and lower ends, and also having a removable leaf spring detachably secured at its upper and lower ends on the side remote from the point where the projections are positioned, each leaf spring having a washer associated therewith so that the washer and spring can be placed in one position so that the projections and the springs will fit into a groove and hold the level in position for leveling the machine with relation to the vertically disposed grooves and said washer and leaf spring being reversible as to position relative to the vertically disposed portions, so as to space the springs farther away from the projections to permit one end of the spring and projection to fit over a vertically disposed rib associated with the framework of the machine.

2. In a spirit level for leveling roving frames and the like, said frame having certain vertically disposed grooves and certain vertically disposed ribs disposed thereon, the level comprising a vertically disposed portion and a horizontally extending portion with a spirit level mounted on the horizontally extending portion, the vertically disposed portion having laterally projecting tongues on each of its sides at its upper and lower ends, and having removably secured in spaced relation to the projections a pair of leaf springs and each leaf spring having associated therewith a washer or shim so that when the washer or shim and leaf springs are secured to the vertically disposed portion in one position, one end of the springs and the projections on one side of the vertically disposed portion will fit into a vertically disposed groove in the machine for holding the level in position so that its horizontally extending portion will be in horizontal position relative to the machine, and said spring and shim or washer being adapted to be removed from the vertically disposed portion, and reversed as to position so as to space the leaf springs further away from the laterally projecting portions on the vertically disposed portions, so that the springs will snugly fit over one side of a vertically disposed rib on the machine while the laterally projecting portions on one side of the vertically disposed portion will fit on the other side of the rib, so that the projections and the leaf springs will hold the level in attached position on the rib so that the horizontally extending portion of the level may be read by an operator while the level frame is attached to the roving frame and the like.

ALBERT M. GUILLET.